United States Patent [19]
Baldwin et al.

[11] Patent Number: 5,908,069
[45] Date of Patent: Jun. 1, 1999

[54] TRACTOR TRAILER TEMPERATURE CONTROL FOR TRACTORS WITH REFRIGERATED TRAILERS

[76] Inventors: Christopher Michael Baldwin; Stephen Aurther Baldwin, Sr., both of 1857 Merrimac Ct., Atlanta, Ga. 30329

[21] Appl. No.: 08/957,082

[22] Filed: Oct. 24, 1997

[51] Int. Cl.[6] .................................................. F28F 1/00
[52] U.S. Cl. ........................ 165/41; 165/42; 165/43; 62/238.6; 237/12.3 B
[58] Field of Search ................... 165/41, 42, 43; 62/236, 89, 238.6; 237/28, 12.3 R, 12.3 B

[56] References Cited

U.S. PATENT DOCUMENTS

| Re. 33,687 | 9/1991 | Greer | 165/43 |
|---|---|---|---|
| 1,608,982 | 11/1926 | Hatch | 165/43 |
| 3,171,474 | 3/1965 | Roane | 165/43 |
| 3,211,076 | 10/1965 | Chancellor et al. | 98/2 |
| 4,398,081 | 8/1983 | Moad | 237/12.3 B |
| 4,756,359 | 7/1988 | Greer | 165/43 |
| 4,780,618 | 10/1988 | Wareman et al. | 62/236 |
| 4,825,663 | 5/1989 | Nijjar et al. | 62/236 |
| 5,253,700 | 10/1993 | Early, Jr. | 165/42 |
| 5,438,842 | 8/1995 | Watkins et al. | 62/89 |
| 5,528,901 | 6/1996 | Willis | 123/142.5 |

*Primary Examiner*—Ira S. Lazarus
*Assistant Examiner*—Terrell McKinnon
*Attorney, Agent, or Firm*—Troutman Sanders LLP; Gerald R. Boss, Esq.

[57] ABSTRACT

A tractor heating system for heating the cabin of a tractor wherein the tractor is carrying a refrigerated trailer. The heating system includes a feed duct in communication with a refer cooling system and the heater of the tractor for communicating heated fluid from the refer cooling system to the heater for heating the tractor cabin. A return duct returns fluid from the tractor heater to the refer cooling system wherein heated fluid from the refer cooling system may be utilized by the tractor heating for heating the cabin of the tractor and also the tractor engine.

19 Claims, 4 Drawing Sheets

TRACTOR TRAILER TEMPERATURE CONTROL FOR TRACTORS WITH REFRIGERATED TRAILERS

BACKGROUND OF THE INVENTION

Generally, this invention relates to a system for providing heat to a tractor's cabin and engine. In particular, this invention relates to a temperature control system for tractors pulling temperature controlled trailers wherein the cooling system of the temperature controlled trailer is interconnected to the tractor cabin's heating system and the tractor engine's cooling system. Consequently, when the truck occupant is resting, during what is normally idle time for the truck, the tractor's engine can be shut down and the trailer's engine, which is required to continue operating keeping the temperature controlled trailer cool, can be used to provide heat to the tractor's cabin and engine.

Normally, during cold climate, a tractor's engine is kept continuously running at idle when the tractor is parked to provide electrical power and heat to the tractor's cabin when the occupant is sleeping. This process, however, is not economical or environmentally safe. Such practice reduces the life of the engine, requires more frequent oil changes, wastes fuel, and produces noxious exhaust fumes.

Additionally, many tractor trailers pull temperature controlled trailer units commonly known as refer trailers which carry perishable goods. The refer motors are also required to continuously operate to control the temperature in the refer trailer and prevent perishable goods from spoiling. Thus, when the tractor is parked, two engines are in operation at the same time, for controlling the temperature of two separate compartments, the refer trailer and the tractor's cabin.

U.S. Pat. No. 4,825,663 discloses an auxiliary power system that provides heating to a tractor's engine and to a tractor's cabin when the tractor's engine is not running. In addition, the auxiliary engine provides electrical power to the main engine's electrical system. This auxiliary system, however, requires redundant equipment and an additional engine separate from the tractor's engine resulting in the the overall weight of the tractor and trailer to increase. However, because the overall tractor's weight is an element to the cost of operation, the added weight to the trailer is not desirable since the added weight increases the cost of operation of the trailer.

U.S. Pat. No. 4,756,359 discloses an auxiliary system for providing air conditioning and heating for the tractor's cabin, as well as heat for the tractor's engine. This auxiliary system, however, uses a belt system to connect the auxiliary system with the main engine's air conditioning compressor and alternator. The hot exhaust from the auxiliary engine provides the heat to the tractor's cabin and engine via heat exchangers. The additional auxiliary engine in this system also adds to the overall weight of the tractor and consequently is not desirable.

Accordingly, it is an object of the present invention to provide heat to a tractor's cabin in an economical manner when the tractor is parked;

Furthermore, it is an object of the present invention to provide heat to a tractor's cabin when the tractor is parked by utilizing the heat from a refrigerated trailer's engine;

Also, it is an object of the present invention to provide heat to a tractor's cabin by interconnecting the refrigerated motor's coolant system to the cabin heating system;

Furthermore, it is the object of this invention to provide heat to both the tractor's cabin and the tractor's engine while the tractor's engine is shutdown to avoid cold startups which increases the difficulty in starting;

SUMMARY OF THE INVENTION

The above objectives are accomplished according to the present invention by providing a tractor cabin heating system for heating the cabin of a tractor when the tractor is carrying a refrigerated trailer. The refrigerated trailer includes a refer cooling system and the tractor cabin includes a heater. The tractor cabin heating system includes a feed duct in communication with the refer cooling system and the tractor cabin heater for communicating heated fluid from the refer cooling system to the heater for heating the tractor cabin. A return duct is in fluid communication with the heater and the refer cooling system for returning fluid from the tractor cabin heater back to the refer cooling system for subsequent reheating. In operation, heated fluid from the refer cooling system is passed from the feed duct to the tractor cabin heater for providing heat to the tractor cabin and returns back to the refer cooling system by the return duct.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
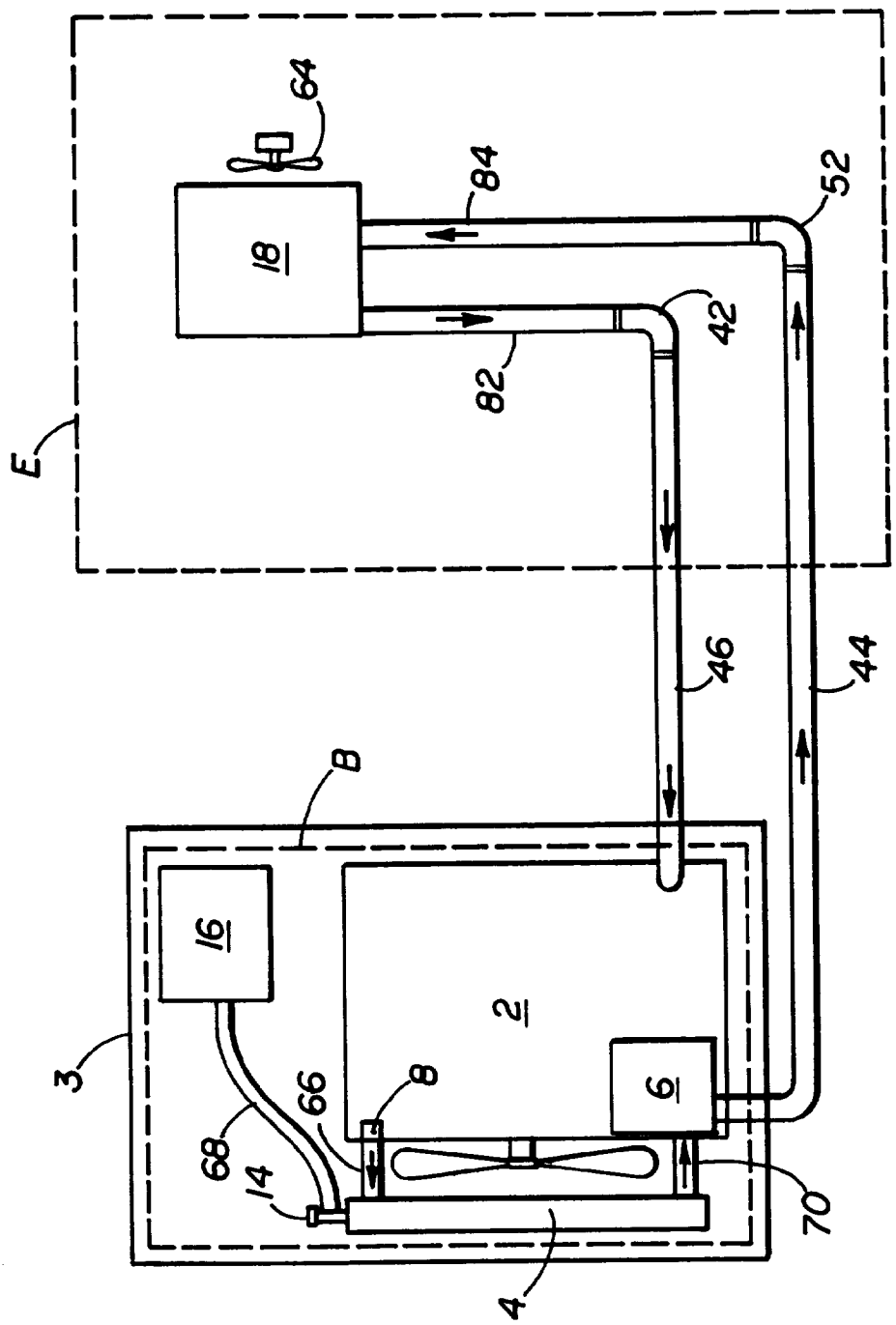
FIG. 1 illustrates the heating system of a tractor cabin without the present invention.

Referring now in more detail to the drawings, a tractor's cabin and engine heating system is illustrated. FIG. 1 illustrates a standard tractor cooling system B and tractor cabin bunk heating system E. As FIG. 1 illustrates, the tractor cooling system B comprises the tractor water jacket 2, tractor water pump 6, tractor radiator 4, tractor radiator pressure cap 14, and coolant lines 66 and 70. The tractor cabin bunk heating system E comprises a tractor bunk heater 18, tractor bunk heater fan 64, and coolant lines 46 and 44 to connect the tractor cooling system B to the tractor cabin bunk heating system E and coolant conduit 68 which connects the tractor expansion tank 16 to the tractor radiator 4. It will be understood what while reference is made to a tractor cabin bunk heating system, the heating system for the tractor cabin can include a heating element anywhere in the tractor including the cabin, bunk, or in both.

In operation, the tractor cooling system B provides cooling for the tractor engine 3. During normal operation, when the tractor engine's operating temperature has been reached, the tractor water pump 6 pumps coolant fluid from the tractor radiator 4 into the tractor water jacket 2 via coolant line 70, as illustrated in FIG. 1. The coolant fluid absorbs the heat from the tractor engine 3. As illustrated in FIG. 1, the heated coolant is directed into the tractor radiator 4 where cool air flowing through the tractor radiator 4 removes the heat from the coolant fluid.

As illustrated in FIG. 1, the tractor cabin bunk 10 is usually heated by the tractor bunk heater 18. In operation, coolant fluid is directed through the heated tractor water jacket 2 where the coolant fluid captures heat. As illustrated in FIG. 1, the heated coolant fluid is pumped by the tractor water pump 6 to the tractor bunk heater 18 via coolant line 44. As the heated coolant flows through the tractor bunk heater 18, tractor bunk heater fan 64, which is controlled by the occupant, directs air flow through the tractor bunk heater 18, thereby directing heat from the tractor bunk heater 18 to the tractor cabin bunk 10. The heated coolant exits the tractor bunk heater 18 and flows back into the tractor water jacket 2 via coolant line 46.

Figure 2:
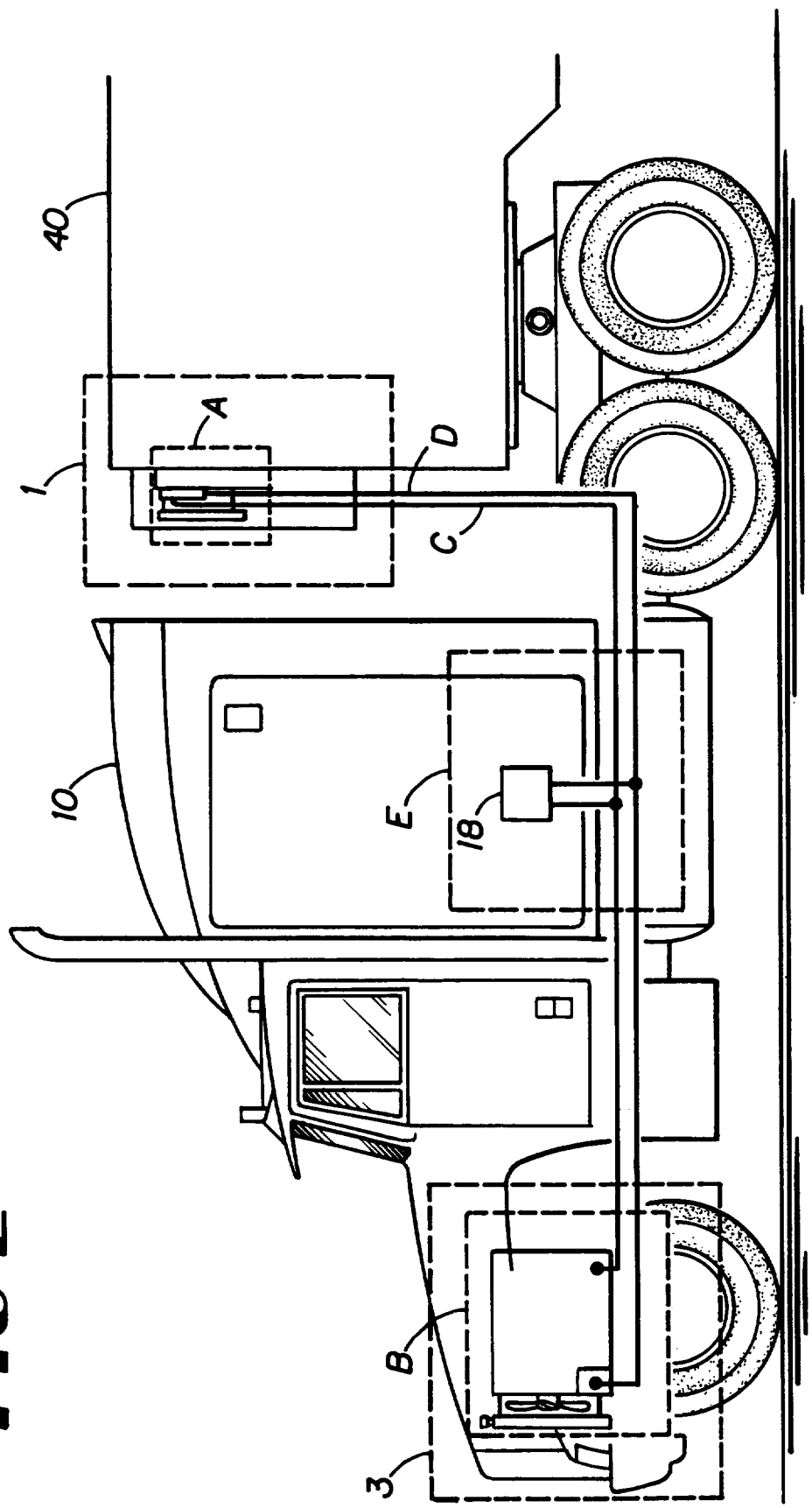
FIG. 2 illustrates a perspective view of a tractor with a refrigerated trailer with the cooling system of the refrigerated trailer interconnected to the heating system of the tractor according to the present invention.

FIG. 2 illustrates the interaction between refer cooling system A with the tractor cooling system B, and the tractor bunk heater 18. Refer coolant feed system C communicates fluid from refer cooling system A to tractor bunk heater 18 and also interconnects with tractor cooling system B. Refer cooling return system D returns water from the tractor bunk heater 18 to refer cooling system A. The interconnection between refer cooling system A with tractor cooling system B and tractor bunk heater 18 is referred to as tractor cabin heating system E.

Figure 3:
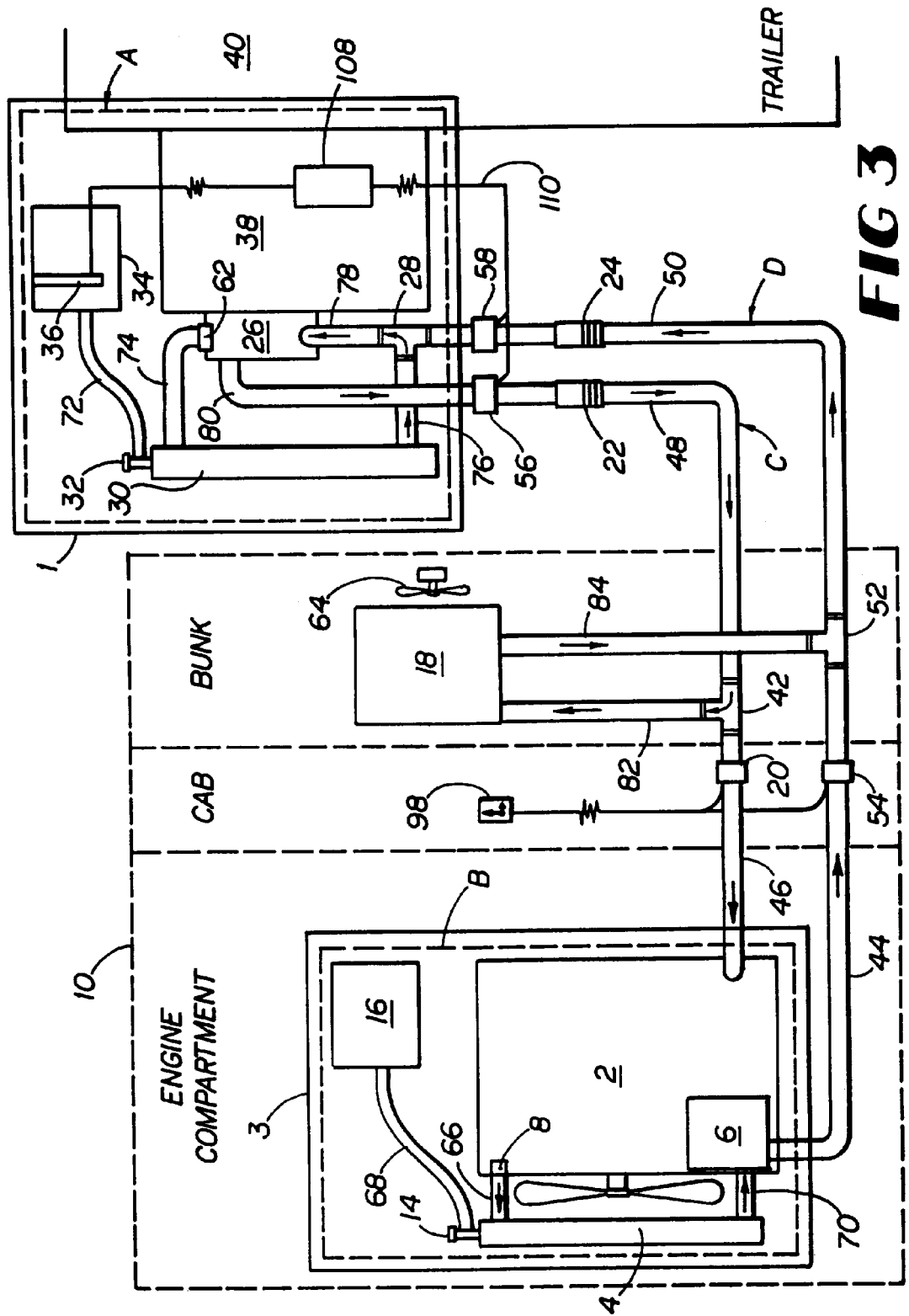
FIG. 3 illustrates a tractor heating system according to the present invention.

FIG. 3 illustrates refer cooling system A. Refer cooling system A, includes the refer water jacket 38, refer radiator 30, refer water pump 26, refer thermostat 62, refer radiator pressure cap 32, refer expansion tank 34, and expansion tank level gauge 36. Coolant conduit 72 connects refer expansion tank 34 to refer radiator 30. Refer water pump 26 mounted on the refer water jacket 38 pumps coolant fluid to refer radiator 30 via coolant conduit 74, and the coolant fluid returns to refer water pump 26 from refer radiator 30 via coolant conduit 76 and refer return conduit 78.

As illustrated in FIGS. 2 and 3, refer coolant feed system C directs the heated coolant fluid to the tractor cabin heating system E. Refer coolant return system D directs the coolant fluid from the tractor cabin heating system E to the refer cooling system A. As illustrated in FIG. 3, refer coolant feed system C includes refer feed conduit 80 and tractor feed conduit 48 with a first control valve 56 connected in line to enable control of the coolant fluid flow. Feed releasable connector 22 allows for the connection and disconnection of refer feed conduit 80 from tractor feed conduit 48. Accordingly, in operation, feeder release connector 22 couples refer feed conduit 80 with tractor feed conduit 48 such that heated fluid may be pumped from the refer cooling system through the tractor bunk heater 18.

As illustrated in FIG. 3, refer coolant return system D includes refer return conduit 78, tractor return conduit 50, refer return tee connect 28 with second control valve 58 connected in line to enable control of the coolant fluid flow. Return releasable connector 24 allows for the connection and disconnection of refer return conduit 78 from tractor return conduit 50. In operation, fluids return from tractor bunk heater 18 through tractor return conduit 50 and back through refer return connect 28 and eventually back to refer water pump 26.

In operation, coolant fluid is pumped from the refer radiator 30 into the refer water jacket 38, by refer water pump 26. The coolant fluid, which is at a lower temperature than the refer water jacket 38, is circulated through the heated refer water jacket 38, where the coolant fluid absorbs heat. Refer water pump 26 pumps a portion of the heated coolant into the refer radiator 30 and the remainder of heated coolant is directed to the tractor cabin heating system E via refer coolant feed system C. The heated coolant enters the refer coolant feed system C via refer feed conduit 80, then the heated coolant travels through first control valve 56, refer releasable connector 22, and tractor feed conduit 48 which is connected to the tractor cabin heating system via feed tee connect 42.

As illustrated in FIG. 3, the heated coolant enters feed tee connect 42 and is directed into the bunk heater 18 via heater feed conduit 82. The heated coolant circulates through the heater 18 and then exits the heater 18 via heater return conduit 84. While the heated coolant is circulated through the heater 18, the heater fan 64, which is preferably controlled by the occupant, is rotating to force air through the heater 18 providing warm air to the tractor cabin bunk 10.

As shown in FIG. 3, the coolant fluid exits the heater 18, and flows into return tee connect 52 and the refer coolant return system D, via tractor return conduit 50. The coolant fluid flows through return releasable connector 24, refer return valve 58, refer return tee connect 28 and refer return conduit 78 into the refer cooling system A.

In addition, a refer water tank level gauge 36 is provided to ensure that the required amount of coolant is in refer cooling system A. Refer expansion tank level gauge 36 is preferably mounted in refer expansion tank 34. In operation, low coolant level in the refer expansion tank 34 would be detected by the refer water tank level gauge 36, which preferably will cause the first and second control valves 56 and 58 to close. As illustrated in FIG. 3, this is accomplished by the refer expansion tank level gauge 36 preferably sending an electrical pulse to the controller 108 via electrical line 106 when the refer expansion tank level gauge 36 detects a low coolant fluid level in the heating system. In turn, the controller 108 will preferably send an electrical pulse to first and second control valves 56 and 58 via electrical line 110.

The heated coolant fluid flows into coolant tee line 42 where a portion is diverted into the tractor bunk heater 18 via coolant line 82, and the remaining coolant fluid is diverted into the tractor water jacket 2 via coolant line 46 thereby heating the tractor engine. The heated coolant fluid that enters the tractor engine water jacket 2, exits via the tractor water pump 6 and flows back to the refer cooling system A via coolant line 44, coolant line tee junction 52, coolant line 50, return releasable connector 24, and refer return valve 58. In operation control valves 20 and 54 may close the connection between tractor cooling system B and refer cooling system A should a leak develop. The tractor bunk heater core fan 64, which is preferably controlled by the occupant, provides air flow through the tractor bunk heater 18 thereby delivering warm air to the tractor cabin bunk 10.

The preferred embodiment enables the occupant to close control valves 20 and 54 thereby preventing or discontinuing the supply of heated coolant to the tractor cooling system B and only providing heat to the tractor cabin bunk 10. This scenario may be considered when the outside temperature is too low for the refer cooling system A to effectively sustain the heat to both the tractor cooling system B and the tractor cabin heater system E. A timer 98, however, may be electrically connected to tractor control valves 20 and 54 whereby the timer 98 could be programmed to open the valves within a specified time period before starting the tractor engine 3.

Figure 4:
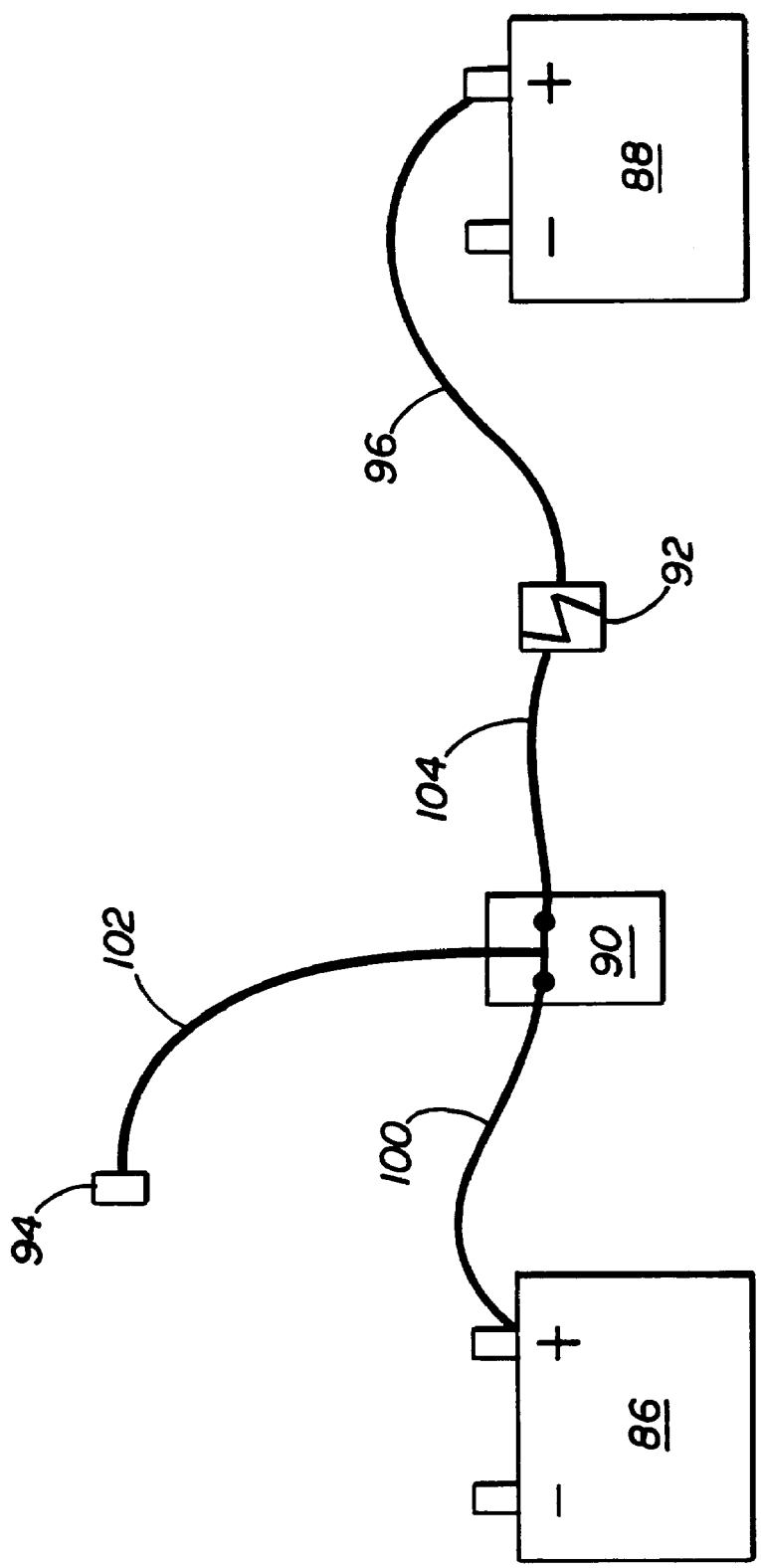
FIG. 4 illustrates a schematic of a charging system, according to the present invention.

In operation, the preferred embodiment also allows for complete disconnection of the refer trailer 40 from the tractor cabin bunk 10 by way of the feed releasable connector 22 and return releasable connector 24 and the electrical releasable connector 92 which is illustrated in FIG. 4. The refer feed conduit 80 and the refer return conduit 78 will be able to connect to each other by way of the feed releasable connector and the return releasable connector when the tractor cabin bunk 10 is separated from the refer trailer 40. This can be accomplished by making the refer side of the releasable connectors, 22 and 24, complimentary. In other words, one line will preferably be male and the other line a corresponding female, thereby allowing the two ends to be joined.

The pressure in the refer cooling system A is preferably maintained at no less than 5 pounds per square inch (psi) below the pressure in the tractor cooling system B. The 5 psi difference in pressure is necessary for the expansion of the coolant fluid in the overall heating system to be able to overcome the force of gravity and enable flow of the coolant fluid to the refer expansion tank 34, rather than the tractor expansion tank 16. The pressure difference may be accomplished by installing a 15 psi tractor radiator pressure cap 14 on the tractor radiator 4 and a 10 psi refer radiator pressure cap 32 on the refer radiator 30. During normal operation, with the tractor engine 3 running, the excess coolant fluid generated by the coolant fluid's expansion in the tractor cooling B system is diverted to the tractor expansion tank 16 via tractor expansion tank conduit 68.

FIG. 4 illustrates the overall battery charging system. As shown in FIG. 4, the battery charging system consist of a tractor battery 86, open/close connector 90, electrical releasable connector 92, refer battery 88, and an actuating device 94. These components are electrically connected, as shown in FIG. 4 by properly rated electrical wires. Refer electrical cable 96 provides the electrical connection between the refer battery 88 and electrical releasable connector 92. Releasable connector cable 104 provides electrical connection between the electrical releasable connector 92 and the open/close connector 90. Finally, tractor electrical cable 100 and actuating electrical cable 102 electrically connect the open/close connector 90 to the tractor battery 86 and the actuating device 94, respectively.

In operation, when tractor engine 3 is off and the refer engine 1 is operating, the refer battery 88 may be used to charge the tractor battery 86. This is accomplished by actuating the open/close connector 90 to close with the actuating device 94 and connecting electrical releasable connector 92 thereby making the circuit between the refer battery 88 and the truck battery 86 electrically continuous. Moreover, the tractor battery 86 may be used to charge the refer battery 88, in the same manner, when the tractor engine 3 is operating and the refer engine 1 is off.

The preferred embodiment provides for a more simplistic and effective method for heating the tractor cabin bunk 10 and the tractor engine 3. This is achieved by interconnecting the refer coolant system A with the tractor cabin heating system E and the tractor cooling system B. This invention will assist in reducing the amount of exhaust being dispersed into the air. In addition, it will reduce the strain on the tractor engine 3 and thereby reduce the amount of preventive maintenance required. Furthermore, the heat being delivered to the tractor engine 3 ensures that the oil and engine parts are at an optimal temperature which should improve the ability to start the tractor engine 3 during cold climates.

While a preferred embodiment of the invention has been described using specific terms, such description is for illustrative purposes only, and it is to be understood that changes and variations may be made without departing from the spirit or scope of the following claims.

We claim:

1. A heating system for heating a tractor cabin when carrying a refrigerated trailer, said refrigerated trailer including a refer cooling system and said tractor cabin including a heater, said heating system comprising:

a feed duct in fluid communication with said refer cooling system and said tractor cabin heater wherein said feed duct communicates heated fluid from said refer cooling system to said tractor cabin heater to heat the tractor cabin; and a return duct in fluid communication with said tractor cabin heater and said refer cooling system wherein said return duct returns fluid from said tractor cabin heater to said refer cooling system.

2. The heating system of claim 1 wherein said feed duct includes a refer feed conduit and a tractor feed conduit interconnected by a releasable connector which allows for the connection and the disconnection of the refer conduit from the tractor feed conduit, said refer conduit in fluid communication with said refer cooling system and said tractor feed conduit in fluid communication with said heater.

3. The heating system of claim 1 wherein said coolant return system includes a refer return conduit interconnected by a return releasable connector with a tractor return conduit, said refer return conduit in fluid communication with said refer return conduit, said refer return conduit in fluid communication with said refer cooling system and said tractor return conduit in fluid communication with said heater.

4. The heating system of claim 1 including a shut off valve disposed within said feed duct for terminating the fluid connection between said refer cooling system and said heater.

5. The heating system of claim 1 wherein said return duct includes a shut off valve terminating the fluid connection between said refer cooling system and said heater.

6. The tractor heating system of claim 1 including a power switching system including a trickle charge circuit and a switch means interconnected therein and operatively connected to the refrigeration unit for selectively directing a trickle charge from the refrigeration unit to the battery of a tractor engine.

7. A heating system for a tractor having a cabin which has a heater, said tractor having a tractor cooling system, wherein said tractor carries a refrigerated trailer including a refer cooling system, said heating system comprising:

a refer coolant feed system in fluid communication with said tractor heater and said tractor cooling system feeding fluid from said refer cooling system to said heater and said tractor cooling engine heating the cabin and the tractor cooling system;

a refer coolant return system in fluid communication with said refer coolant system, said heater and said tractor cooling system returning fluid from said tractor cooling system and the tractor heater to said refer cooling system.

8. The tractor heating system of claim 7 wherein said refer coolant feed system includes a refer feed conduit and a tractor feed conduit interconnected by a releasable connector which allows for the connection and the disconnection of the refer conduit from the tractor feed conduit, said refer conduit in fluid communication with said refer cooling system and said tractor feed conduit in fluid communication with said heater.

9. The tractor heating system of claim 7 wherein said refer coolant return system includes a refer return conduit interconnected by a return releasable connector with a tractor return conduit, said refer return conduit in fluid communication with said refer return conduit, said refer return conduit in fluid communication with said refer cooling system and said tractor return conduit in fluid communication with said heater.

10. The tractor heating system of claim 7 including a shut off valve disposed within said feed duct for terminating the fluid connection between said refer cooling system and said heater.

11. The tractor heating system of claim 7 wherein said return duct includes a shut off valve terminating the fluid connection between said refer cooling system and the said heater.

12. The tractor heating system of claim 7 including a T junction having at least three connection members with one connection member interconnecting with said refer coolant feed system, the second connector member connecting with a tractor engine feed conduit which communicates with the tractor coolant system, and a third connector member connecting with a heater feed conduit which communicates with the tractor heater.

13. The tractor heating system of claim 12 including a first control valve for opening and closing the fluid communication between the T junction and tractor engine cooling system.

14. The tractor heating system of claim 13 including a control mechanism interconnected with a timer for opening said first control valve.

15. The tractor heating system of claim 7 including a T junction having at least three connection members with one connection member interconnecting with the refer coolant return system, the second connector member connecting with a tractor engine return conduit which communicates with the tractor coolant system, and a third connector member connecting with a heater return conduit which communicates with the tractor heater.

16. The tractor heating system of claim 15 including a second control valve for opening and closing the fluid communication between the T junction and tractor engine return conduit.

17. The tractor heating system of claim 16 including a control mechanism and timer for opening said second control valve.

18. The tractor heating system of claim 7 wherein said tractor cooling system includes a tractor expansion tank and a tractor radiator pressure cap for pressurizing a tractor radiator and wherein said refer cooling system includes a refer expansion tank and a refer radiator pressure cap for pressurizing a refer radiator, said refer radiator pressure cap pressurizing said refer radiator at least five pounds less than said tractor radiator pressure cap pressurizing said tractor radiator.

19. The tractor heating system of claim 7 including a power switching system including a trickle charge circuit and the switch means interconnected therein and operatively connected to the refrigeration unit for selectively directing a trickle charge from the refrigeration unit to the battery of a tractor engine.

* * * * *